April 16, 1968 K. P. IVANOV ETAL 3,377,829
DEVICE FOR PRODUCING BEVEL GEAR TEETH BY ROLLING
Filed Sept. 1, 1964

# United States Patent Office 3,377,829
Patented Apr. 16, 1968

3,377,829
DEVICE FOR PRODUCING BEVEL GEAR
TEETH BY ROLLING
Konstantin Petrovich Ivanov, Igor Ivanovich Kirichinsky, and Alexandr Vasiljevich Butuzov, Moscow, U.S.S.R., assignors to Nauchno-Issledovatelsky Institute Tekhnologii Avtomobilnoi Promyshlennosti, Moscow, U.S.S.R.
Filed Sept. 1, 1964, Ser. No. 393,530
3 Claims. (Cl. 72—86)

This invention relates to methods of producing bevel gear teeth on rolling machines, and more particularly, to the realization of these methods by using devices comprising a synchronizer imparting a rotary motion to a rolling tool and a gear blank.

The known methods of producing bevel gear teeth on rolling machines consist in that synchronizer toothed wheels engage one another simultaneously the tool operating one gear blank.

Since in said devices one of the synchronizer toothed wheels is rigidly secured to the rolling tool, the latter turns in relation to the blank when being forced into it, thereby shearing the metal of the blank during teeth generation.

This causes an expenditure of excessive power (up to 30 percent) on non-desirable shear of metal, which results in metal laps on the foot of tooth, thus reducing metal strength.

It is an object of the present invention to eliminate the disadvantages mentioned above.

According to the invention, this object is attained by forcing a tool into a gear blank after the synchronizer toothed wheels have been closely engaged.

A device designed for the realization of this method is constituted as a tool head to be used on a gear rolling machine comprising a spindle carrying a synchronizer toothed wheel and an actuating cylinder, the rod of said cylinder displacing the spindle of the synchronizer toothed wheel in axial direction. According to the invention, the tool head houses the spindle of the rolling tool.

The synchronizer toothed wheel spindle is hollow and accommodates the rolling tool spindle telescopically connected to it and provided with an actuating cylinder, whose rod moves said tool spindle in axial direction, independently of the synchronizer toothed wheel displacement in the same direction.

The invention will further be described in connection with an exemplary embodiment thereof, reference being made to the appended drawings, wherein.

Figure 1:
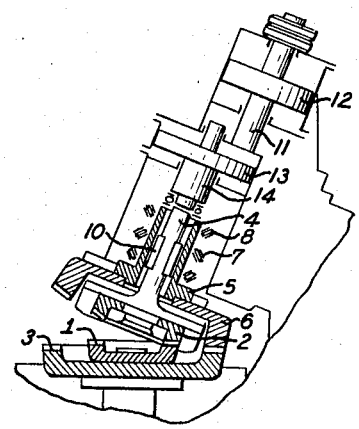
FIG. 1 is a diagrammatic illustration partly in section of a tool head and of a synchronizer toothed wheel carrying a blank.

The rolling of teeth on blank 1 (FIG. 1) is performed by rolling tool 2. Blank 1 is rigidly secured to synchronizer toothed wheel 3, and tool 2 is mounted on tool spindle 4 which is slidable in axial direction independently of spindle 5 of synchronizer toothed wheel 6.

After blank 1 is arranged on toothed wheel 3, the latter is given a rotary motion and wheel 6 is placed in mesh with wheel 3. Wheels 3 and 6 being in a tight mesh, spindle 4 is moved in axial direction so that tool 2 will force its way into blank 1 to a preset depth, with their subsequent relative rolling.

Figure 2:
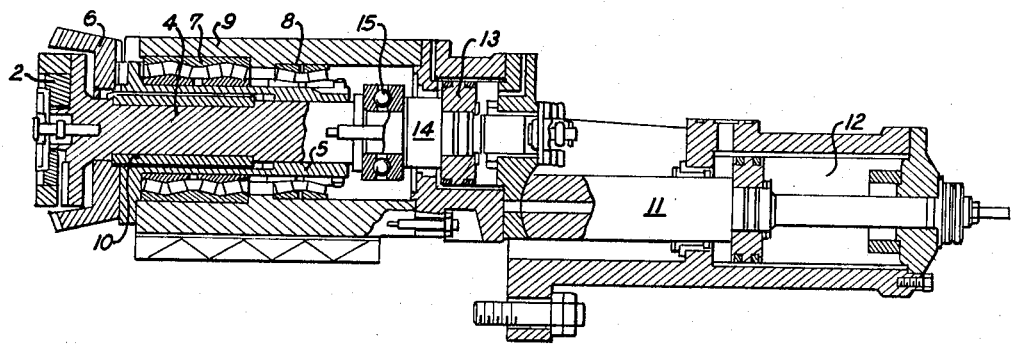
FIG. 2 is an axial cross-section of a tool head.

As shown in FIG. 2 the hollow spindle 5 of the tool head supports toothed wheel 6 and is rotatable in bearings 7 and 8 incorporated in housing 9. Spindle 5 houses the tool spindle 4 in telescoping relation through spline coupling 10.

Spindle 5 of wheel 6 is driven in axial direction from rod 11 of actuating cylinder 12 through housing 9 rigidly connected with rod 11.

At the face end of housing 9 is secured actuating cylinder 13 which, by means of its rod 14, imparts an independent axial motion to tool spindle 4 via thrust bearing 15.

What is claimed is:
1. A device for rolling bevel gear teeth comprising: a rotatable hollow spindle supported for axial displacement; a synchronizer toothed wheel secured to said hollow spindle; a tool spindle telescopically mounted in said hollow spindle and rotatable therewith; a rolling tool secured to said tool spindle, means coupled to the tool spindle for axially shifting said tool spindle in said hollow spindle for thereby supplying axial feed to said rolling tool; a second synchronizer toothed wheel adapted for supporting a blank fastened thereon and periodically engaging with the first said toothed wheel after their angular speeds are synchronized; and means for rotating said second toothed wheel.

2. A device as claimed in claim 1 wherein said means for axially shifting the tool spindle comprises a hydraulic piston and cylinder arrangement coupled to the tool spindle for displacing the tool spindle independently of said hollow spindle.

3. A device as claimed in claim 2 comprising an independent hydraulic piston and cylinder arrangement for axially displacing the hollow spindle.

References Cited
UNITED STATES PATENTS

| | | | |
|---|---|---|---|
| 1,240,916 | 9/1917 | Anderson | 72—86 X |
| 1,617,445 | 2/1927 | Gleason | 29—159.2 |
| 1,669,818 | 5/1928 | Gleason | 72—84 |
| 2,423,932 | 7/1947 | Finzel | 72—24 |

CHARLES W. LANHAM, *Primary Examiner.*

K. C. DECKER, *Assistant Examiner.*